US00RE46569E

(19) United States
(12) Reissued Patent
Tynderfeldt et al.

(10) Patent Number: US RE46,569 E
(45) Date of Reissued Patent: *Oct. 10, 2017

(54) METHOD FOR IMPLICIT CONVEYING OF UPLINK FEEDBACK INFORMATION

(71) Applicant: Telefonaktiebolaget L M Ericsson (publ), Stockholm (SE)

(72) Inventors: Tobias Tynderfeldt, Solna (SE); David Astely, Bromma (SE); Stefan Parkvall, Bromma (SE); Per Johan Torsner, Masaby (FI)

(73) Assignee: Telefonaktiebolaget LM Ericsson (publ), Stockholm (SE)

( * ) Notice: This patent is subject to a terminal disclaimer.

(21) Appl. No.: 14/963,811

(22) Filed: Dec. 9, 2015

Related U.S. Patent Documents

Reissue of:
(64) Patent No.: 8,605,607
Issued: Dec. 10, 2013
Appl. No.: 12/595,108
PCT Filed: Apr. 30, 2008
PCT No.: PCT/SE2008/050387
§ 371 (c)(1),
(2) Date: Oct. 8, 2009
PCT Pub. No.: WO2008/127184
PCT Pub. Date: Oct. 23, 2008

(30) Foreign Application Priority Data

Apr. 11, 2007 (SE) ..... 0700903

(51) Int. Cl.
*H04L 1/00* (2006.01)
*H04L 5/00* (2006.01)

(52) U.S. Cl.
CPC ..... *H04L 1/0027* (2013.01); *H04L 1/0026* (2013.01); *H04L 1/0029* (2013.01); *H04L 5/001* (2013.01); *H04L 5/0055* (2013.01)

(58) Field of Classification Search
CPC ... H04L 1/0027; H04L 1/0029; H04L 1/0032; H04L 1/0034; H04L 1/0038; H04L 1/1607; H04L 1/1854
See application file for complete search history.

(56) References Cited

U.S. PATENT DOCUMENTS 6,266,513 B1 * 7/2001 Briancon ..... 340/7.22
6,363,425 B1 * 3/2002 Hook et al. ..... 709/226
(Continued)

FOREIGN PATENT DOCUMENTS

EP 1873948 A1 1/2008
WO 2005071887 A1 8/2005
(Continued)

OTHER PUBLICATIONS

NEC Group, "Efficient Downlink ACK/NACK signalling for E-UTRA", TSG-RAN WG1#48Bis, Mar. 26-30, 2007, pp. 1-3, St. Julian's, Malta, R1-071508.
(Continued)

*Primary Examiner* — Mary Steelman
(74) *Attorney, Agent, or Firm* — Coats & Bennett, PLLC

(57) ABSTRACT

Method and apparatus for conveying feedback reports from a data receiving party (300) for data received from a data sending party (302) in a wireless connection. A plurality of feedback resources (304) assigned to different feedback information codes are allocated to the data receiving party for transmitting feedback reports. After checking whether the data was received correctly or not, the data receiving party selects a feedback resource (FR2) with a feedback information code that corresponds to one or more feedback reports on the received data. The data receiving party then sends feedback information on the selected feedback resource to the data sending party, thereby conveying the corresponding feedback information code. In this way, mul-
(Continued)

tiple feedback reports can be conveyed in a single feedback resource to the data sending party while still retaining single carrier properties.

30 Claims, 3 Drawing Sheets

(56) References Cited

U.S. PATENT DOCUMENTS

| | | | | |
|---|---|---|---|---|
| 6,842,621 | B2 * | 1/2005 | Labun et al. | 455/456.3 |
| 7,158,802 | B2 * | 1/2007 | Dick et al. | 455/509 |
| 7,350,125 | B2 * | 3/2008 | Jang et al. | 714/748 |
| 7,639,660 | B2 * | 12/2009 | Kim et al. | 370/343 |
| 8,077,596 | B2 * | 12/2011 | Naguib et al. | 370/208 |
| 8,331,252 | B2 * | 12/2012 | Visuri et al. | 370/252 |
| 2002/0034263 | A1 * | 3/2002 | Schmidl et al. | 375/299 |
| 2005/0159166 | A1 * | 7/2005 | Jonsson et al. | 455/452.2 |
| 2005/0220042 | A1 | 10/2005 | Chang et al. | |
| 2006/0291410 | A1 * | 12/2006 | Herrmann | 370/328 |
| 2007/0049324 | A1 * | 3/2007 | Sambhwani et al. | 455/525 |
| 2007/0066232 | A1 * | 3/2007 | Black | 455/67.11 |
| 2007/0211667 | A1 * | 9/2007 | Agrawal et al. | 370/335 |
| 2007/0254598 | A1 * | 11/2007 | Bachl et al. | 455/73 |
| 2007/0280365 | A1 * | 12/2007 | Seki | 375/260 |
| 2008/0022191 | A1 * | 1/2008 | Stolpman et al. | 714/776 |
| 2008/0080422 | A1 * | 4/2008 | Frederiksen et al. | 370/329 |
| 2008/0080465 | A1 * | 4/2008 | Pajukoski et al. | 370/342 |
| 2008/0084843 | A1 * | 4/2008 | Gorokhov et al. | 370/330 |
| 2008/0084844 | A1 * | 4/2008 | Reznik et al. | 370/330 |
| 2008/0161033 | A1 * | 7/2008 | Borran et al. | 455/522 |
| 2008/0165717 | A1 * | 7/2008 | Chen et al. | 370/312 |
| 2008/0170634 | A1 * | 7/2008 | Kwak et al. | 375/260 |
| 2008/0225788 | A1 * | 9/2008 | Inoue et al. | 370/329 |
| 2008/0225791 | A1 * | 9/2008 | Pi et al. | 370/330 |
| 2008/0232307 | A1 * | 9/2008 | Pi et al. | 370/328 |
| 2008/0233965 | A1 * | 9/2008 | Kent et al. | 455/450 |
| 2008/0253318 | A1 * | 10/2008 | Malladi et al. | 370/328 |
| 2008/0310540 | A1 * | 12/2008 | Tiirola et al. | 375/267 |
| 2009/0052381 | A1 * | 2/2009 | Gorokhov et al. | 370/329 |
| 2009/0316811 | A1 * | 12/2009 | Maeda et al. | 375/260 |
| 2010/0085912 | A1 * | 4/2010 | Chun et al. | 370/328 |
| 2010/0118773 | A1 * | 5/2010 | Kawamura et al. | 370/328 |
| 2010/0238870 | A1 * | 9/2010 | Mitra et al. | 370/329 |

FOREIGN PATENT DOCUMENTS

| | | | |
|---|---|---|---|
| WO | 2005088886 | A1 | 9/2005 |
| WO | 2006114855 | A1 | 11/2006 |
| WO | 2007023022 | A1 | 3/2007 |
| WO | 2007148710 | A1 | 12/2007 |

OTHER PUBLICATIONS

NTT Docomo et al., "Performance Enhancement Techniques for ACK/NACK in E-UTRA Uplink", 3GPP TSG RAN WG1 Meeting #48bis, Mar. 26-30, 2007, pp. 1-2, St. Julian's, Malta, R1-071651.

LG Electronics, "Further results on the different power offsets for ACK/NACK signaling", 3GPP TSG RAN WG 1 #24, Feb. 18-22, 2002, pp. 1-3, Orlando US, TSGR1-02-0363.

Texas Instruments, "Uplink Transmission of ACK/NACK Signals", 3GPP TSG RAN WG1 #48bis, Mar. 26-30, 2007, pp. 1-6, St. Julian's, Malta, R1-071488.

NTT Docomo et al., "Implicit Resource Allocation of ACK/NACK Signal in E-UTRA Uplink", 3GPP TSG RAN WG1 #48bis, Mar. 26-30, 2007, pp. 1-3, St. Julian's, Malta, R1-071650.

NTT Docomo et al., "Performance Enhancement Techniques for ACK/NACK in E-UTRA Uplink", 3GPP TSG RAN WG1 Meeting #47, Nov. 6-10, 2006, pp. 1-2, Riga, Latvia, R1-063321.

Redacted Excerpts from TCL's Third Supplemental Response to Ericsson's Interrogatory Nos. 12-14 from Ericsson's Third Set of Interrogatories, *TCL Communication Technology Holdings, Ltd.*, vs. *Telefonaktiebolaget LM Ericsson*, Case No. SACV14-00341 (C.D. Cal. served Dec. 7, 2015), pp. 1, 337, 338, and 414.

3rd Generation Partnership Project. Performance Enhancement Techniques for ACK/NACK in E-UTRA Uplink. 3GPP TSG RAN WG1 Meeting #47, R1-063321, Riga, Latvia, Nov. 6-10, 2006.

3rd Generation Partnership Project. "Uplink Transmission of ACK/NACK Signals." 3GPP TSG RAN WG1 #48bis, R1-071488, St. Julians, Malta, Mar. 26-30, 2007.

3rd Generation Partnership Project. "Implicit Resource Allocation of ACK/NACK Signal in E-UTRA Uplink." 3GPP TSG RAN WG1 Meeting #48bis, R1-071650, St. Julians, Malta, Mar. 26-30, 2007.

* cited by examiner

METHOD FOR IMPLICIT CONVEYING OF UPLINK FEEDBACK INFORMATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates generally to a method and apparatus for optimising wireless transmissions in a telecommunication system requiring feedback reports for received data.

BACKGROUND

In 3GPP (3rd Generation Partnership Project), the cellular packet-switched communication systems HSPA (High Speed Packet Access) and LTE (Long Term Evolution) have been specified for radio transmission of data packets between user terminals and base stations in a cellular/mobile network. Transmissions from the base station to the user terminal is referred to as "downlink" and transmissions in the opposite direction is referred to as "uplink". In the following description, "terminal" is used to generally represent any user equipment, commonly referred to as "UE" in the above systems, that is capable of wireless communication, e.g. with base stations in a cellular/mobile network.

There are two basic modes of operation available for wireless transmissions: FDD (Frequency Division Duplex) and TDD (Time Division Duplex). In FDD, downlink and uplink transmissions are made at separate frequency bands, such that packets can be transmitted in the downlink and uplink at the same time without mutual interference. In TDD, on the other hand, downlink and uplink transmissions are made on the same frequency band and must therefore be separated in time to avoid interference.

The TDD operation mode is flexible in that the duration of downlink and uplink transmissions can be configured depending on the traffic intensity in the respective downlink and uplink directions, thus allowing for connections with asymmetric transmission schemes. For downlink intensive connections, the downlink time period may thus be configured greater than the uplink time period, and vice versa for uplink intensive connections.

For LTE, a new physical layer is currently being standardized in 3GPP that is based on OFDM (Orthogonal Frequency Division Multiplexing) in the downlink and SC-FDMA (Single Carrier Frequency Division Multiple Access) in the uplink. The new physical layer shall support both FDD and TDD operation, and there should be a high degree of commonality between these two modes of operation. The SC-FDMA properties in the uplink require that any data transmitted from each terminal basically maintains single carrier properties.

The transmissions in both FDD and TDD operation are generally scheduled in radio frames, and each radio frame is typically divided into multiple sub-frames. In the following description, the term "sub-frame" is used to generally represent a predefined transmission time interval "TTI" in which a portion of information can be transmitted as a "data block", although not limited to any particular standard or duration. A data packet can be sent in any number of sub-frames depending on the packet size and the sub-frame length. LTE prescribes that one data packet is typically accommodated in a single sub-frame. A sub-frame can generally contain one or more data blocks, in LTE also called "transport blocks". Currently, LTE allows for two transport blocks per terminal in a single downlink sub-frame.

In LTE, the predefined radio frame is 10 ms (milliseconds), which is divided into ten predefined sub-frames of 1 ms each. In the FDD mode, where packets can be transmitted in the downlink and uplink simultaneously, there are 10 downlink sub-frames "DL" and 10 uplink sub-frames "UL" available during one radio frame on separate frequency bands $F_1$ and $F_2$, respectively, as illustrated schematically in FIG. 1a. In the TDD mode, there are in total 10 downlink and uplink sub-frames available during one radio frame, which can thus be transmitted only one at a time on a common frequency band F.

As mentioned above, downlink and uplink transmissions can be configured in TDD depending on the traffic demands in either direction. For example, the downlink/uplink allocation can be configured to 8 downlink sub-frames and 2 uplink sub-frames during one radio frame on the same frequency band F, as illustrated schematically in FIG. 1b. Another possible configuration could be 5 DL:5 UL sub-frames, and yet another configuration could be 2 DL:8 UL sub-frames. The alternation pattern of downlink/uplink sub-frames can also be configured optionally. For example, the downlink/uplink sub-frame pattern in FIG. 1b could be modified into 8 successive downlink sub-frames followed by 2 uplink sub-frames.

A single base station may transmit data packets in sub-frames on the downlink to one or more terminals, and the terminals transmit data packets in sub-frames on the uplink to the base station. The transmission in either direction is typically subjected to various disturbances, including propagation fading and interference from reflections and other transmissions, such that errors may have been introduced in the data packets when received. Thus, the channel between a base station and a terminal is often referred to as a "lossy" channel. Errors may also arise due to a poor receiver and/or antenna.

When receiving a packet with data in a sub-frame, the receiver in the terminal or in the base station is configured to check as to whether any errors are present in the received packet. A common method of detecting errors involves calculation of a check-sum or the like, which is well-known in the art. To enable correction of such errors, the data sending party must retransmit any erroneously received packet, unless some error correction mechanism can be applied successfully at the data receiving party. Therefore, the receiving party is typically obliged to send a feedback report to the data sending party for each received packet or sub-frame, indicating if the packet was basically received correctly, i.e. without errors, or not.

If the packet was received correctly, the data receiving party sends an acknowledgement "ACK", and if the packet contained errors, it sends a negative acknowledgement "NACK". Although the terms ACK and NACK are frequently used this description, any equivalent or similar messages may be used for feedback reports and the present invention is not limited in this respect. "Feedback report" is used in the following as a generic term for such ACK/NACK messages and their equivalents.

Both HSPA and LTE employ a HARQ (Hybrid Automatic Repeat ReQuest) protocol in their respective MAC (Medium Access Control) layers. The basic functionality of the processes defined in the HARQ protocol is to correct any erroneously received packets by means of retransmission based on the above-described feedback reporting mechanism. In this context, a feedback report is sometimes called "HARQ status report".

For example, the data receiving party can simply discard an erroneously received packet. In more advanced solutions, the receiving party stores the signal representing the erroneously received packet in a buffer and combines this stored information with the retransmission. This is often referred to as "HARQ with soft combining" which can be used to increase the probability of correctly decoding the transmitted packet. In HARQ with soft combining, the pattern of coded bits in a particular packet may differ between transmission and retransmission, although they must obviously represent the same information.

The HARQ process is used to associate a potential retransmission to its original transmission in order to enable the soft combining at the data receiving party. When the receiving party has reported correct reception of data sent on a HARQ process, that data can be used to transmit new data. Consequently, before the reception of a HARQ status report from the receiving party, the data sending party does not know whether it should transmit new data or retransmit the "old data". In the meantime, the sending party therefore "stops and waits" until the result of the transmission is reported. In order to still be able to utilize the link during these waiting periods, multiple parallel HARQ processes can be applied which allows for continuous transmission.

For example, when a packet is transmitted on the downlink, the receiving terminal checks for errors in the packet and sends a feedback report to the base station. If the base station then detects a NACK, it will retransmit the information in the packet. This mechanism can also be used for packets sent on the uplink. In LTE, the feedback required for HARQ with soft combining is conveyed by a single bit indicating either ACK or NACK. The timing relation between the packet transmission from the sending party and the feedback report transmission from the receiving party is typically used to indicate which packet the feedback report relates to.

In FDD, the number of available sub-frames is equal in the downlink and the uplink, as shown in FIG. 1a. Consequently, it is possible to send a feedback report for a data block received in one downlink sub-frame in a given uplink sub-frame according to a "one-to-one relation", using a fixed time interval between reception and feedback. Thereby, the data sending party can derive which HARQ process a received feedback report refers to, based on which sub-frame the report was received in. In TDD, on the other hand, data blocks in multiple sub-frames may be received on the downlink before it is possible to send corresponding feedback reports, or ACK/NACKs, on the uplink, such as when the number of allocated downlink sub-frames is greater than the number of allocated uplink sub-frames.

In the allocation example of FIG. 2, there are 8 downlink sub-frames but only 2 uplink sub-frames available. Hence, feedback reports for the 8 downlink sub-frames must be transmitted in the 2 uplink sub-frames. Depending on how many users that have been scheduled in the downlink sub-frames, the number of feedback reports that need to be transmitted may increase by a factor 4. Furthermore, if a single terminal has been scheduled to receive data in all available downlink sub-frames, that terminal will need to transmit feedback reports for multiple data blocks received in a plurality of downlink sub-frames during a single uplink sub-frame. Still further, more than one data or transport block may be accommodated in a single received sub-frame, e.g. relating to one or more different sessions or media streams on a higher level, where each data block needs a separate feedback report such that the number of necessary feedback reports may increase even more.

In TDD, the above-described report mechanism with a fixed time interval cannot generally be used, since the feedback report for a received sub-frame cannot be transmitted a fixed time interval after receiving the sub-frame if the corresponding sub-frame is not available for transmission from the data receiving party. Consequently, the feedback report for data in that received sub-frame must be delayed at least to the first sub-frame available for transmission. Moreover, the data receiving party typically requires a certain delay after receiving a sub-frame, for processing the data therein and to determine if it was received correctly or not, before a feedback report can be sent for that sub-frame. For example, if the receiver needs a delay of at least 1 sub-frame for processing, a received sub-frame k cannot be reported until sub-frame k+2 or later.

A straightforward and obvious solution is to send a feedback report for a received sub-frame in the first available sub-frame after a minimum delay period needed for processing. Hence, if one or more sub-frames after the delay period are allocated for reception, the feedback report is further delayed until the first sub-frame available for transmission occurs. As a result, a plurality of feedback reports must typically be sent in the same sub-frame. This is particularly a problem when it is desirable to reduce the number of such reports in a single sub-frame.

In LTE, each sub-frame typically includes two slots, each slot in turn consisting of a plurality of OFDM-symbols. In the frequency domain, each OFDM-symbol can be seen as a set of sub-carriers. The sub-carrier spacing is typically 15 kHz and the number of sub-carriers in the set depends on the bandwidth of the frequency carrier. Further, the sub-carriers are divided into groups of multiple adjacent sub-carriers, e.g. 12 sub-carriers. Each group of sub-carriers in a slot is generally referred to as a "Resource Block". Within a sub-frame, these resource blocks are arranged as resource block pairs in which information can be conveyed.

As explained above, if a terminal has been scheduled data packets in multiple downlink sub-frames, the terminal is typically required to transmit multiple feedback reports in a single uplink sub-frame. However, single carrier properties must be retained in uplink transmissions according to LTE. As a result, a terminal cannot transmit in more than one resource block and still transmit a single carrier signal, since the corresponding sub-carriers are not in contiguous spectrum, i.e. adjacent frequencies.

Further, if the terminal would transmit multiple feedback reports within a single resource block, the combined signal would typically still not retain its single carrier property as the feedback reports must be transmitted with different CDM (Code Division Multiplexing) code sequences within the resource block, thereby being uncorrelated. In other words, it is typically only possible for a terminal to transmit one feedback report at a time and still maintain the single-carrier properties.

If BPSK (Binary Phase Shift Keying) modulation is used, one bit, i.e. 1 or 0, is conveyed per symbol and the terminal can therefore transmit one feedback report in an uplink sub-frame. By using QPSK (Quadrature Phase Shift Keying) modulation, it is possible for the terminal to convey two feedback reports in an uplink sub-frame, as QPSK allows for two bits per symbol. Even higher modulation schemes, e.g. 16QPSK allowing 4 bits per symbol, are deemed too sensitive to signal disturbances generally resulting in unacceptable error rates. Increasing the modulation order will generally decrease the robustness of the feedback reports, and it is important that the feedback reports are detected correctly with a relatively high probability. The error probability is preferably in the order of $10^{-3}$ to $10^{-4}$. Therefore, a higher modulation order than QPSK is not an attractive solution to the problem of reporting multiple feedback reports during a single uplink sub-frame.

However, when a transmission allocation of 8 DL:2 UL sub-frames is used, a terminal that has been scheduled in all downlink sub-frames would need to send at least four feedback reports in an uplink sub-frame. Thus, only two possible feedback reports when using QPSK according to the above are clearly not sufficient. Furthermore, a terminal may receive two data blocks, e.g. MAC PDUs (Packet Data Units), in a single downlink sub-frame, each data block requiring a feedback report. In this case, the terminal would need to send twice as many feedback reports in each uplink sub-frame, making the limitation of sending only two feedback reports while retaining single carrier properties even more significant.

A potential consequence of the limitations above could be that it is not possible to transmit data to a single terminal in all downlink sub-frames, which would "artificially" limit the DL capacity by the lack of feedback opportunities.

SUMMARY

Teachings presented herein advantageously enable a data receiving party to transmit plural feedback reports in a single sub-frame to a data sending party, without losing the single carrier properties of the transmitted subframe.

According to some aspects, a method and apparatus are provided in a data receiving party for conveying feedback reports for data received from a data sending party in a wireless connection. A resource obtaining unit (or circuit) at the data receiving party obtains allocation information about a plurality of feedback resources available for transmitting feedback reports, the feedback resources being associated with different feedback information codes that the data receiving party can use to convey implicit feedback information on received data. A selecting unit (or circuit) selects a feedback resource from the obtained feedback resources, which is assigned to a feedback information code that corresponds to one or more feedback reports on the received data, and a sending unit (or circuit) then sends feedback information on the selected feedback resource to the data sending party.

In various embodiments, explicit feedback information is sent on the selected feedback resource and the selected feedback resource indicates further implicit feedback information. QPSK modulation can then be used to convey two bits of explicit feedback information and the feedback resource selection could be used to convey at least one further bit of implicit feedback information, thereby forming a combined codeword with the two bits of explicit feedback information and at least one further bit of implicit feedback information. Each bit in the formed codeword may relate to a specific sub-frame of received data.

In other embodiments, the resource obtaining unit can obtain the resource allocation information in a control message during a cell selection or handover procedure, or as given by a downlink scheduling assignment for the terminal or by which resources the data is transmitted on from the network node.

According to some further aspects, a method and apparatus are provided in a network node for obtaining feedback reports from a terminal for data transmitted to the terminal from the network node in a wireless connection. A resource providing unit (or circuit) in the network node provides allocation information to the terminal about a plurality of feedback resources available for transmitting feedback information, the feedback resources being associated with different feedback information codes that the terminal can use to convey implicit feedback information on received data. A receiving unit (or circuit) then receives feedback information on the transmitted data from the terminal on a feedback resource selected by the terminal. Thereby, a detecting unit (or circuit) can detect one or more feedback reports based on the feedback information code assigned to the selected feedback resource.

In various further embodiments, the receiving unit can receive explicit feedback information on the selected feedback resource where the selected feedback resource indicates further implicit feedback information. The receiving unit can further detect which feedback resource the terminal transmits the feedback information on by detecting a received signal strength and determining if the received signal strength is strong enough to be distinguished from noise and/or interference. The feedback resource can also be detected by comparing the received signal strength on all allocated feedback resources and selecting the feedback resource with highest signal strength and/or SINR (Signal-Noise Ratio).

In other embodiments, the resource providing unit can send resource allocation information to the terminal in a control message during a cell selection or handover procedure. The resource allocation information can also be provided as given by a downlink scheduling assignment for the terminal or by which resources the data is transmitted on from the network node.

Further possible features and benefits of the present invention will be explained in the detailed description below.

BRIEF DESCRIPTION OF THE DRAWINGS

The invention will now be explained in more detail by means of exemplary embodiments and with reference to the accompanying drawings, in which.

DETAILED DESCRIPTION

Briefly described, a data receiving party transmitting explicit feedback information to a data sending party can convey further implicit feedback information by transmitting the explicit feedback information on a selected feedback resource, out of a plurality of available feedback resources. The available feedback resources may be different resource blocks that are allocated for conveying feedback information. Each available feedback resource is assigned a code of feedback information comprising at least one information bit, such that the actual selection of feedback resource implies said code of feedback information. The information bit(s) in the code of feedback information thus indicates in a predetermined manner whether data has been received successfully or not, i.e. ACK or NACK.

For example, if 2 feedback resources are available for selection in a sub-frame allocated for transmission, referred to as a TX sub-frame, each feedback resource can imply one information bit: e.g. 1 indicating ACK or 0 indicating NACK, such that one received sub-frame with data can be reported as implicit feedback information by the feedback resource selection. In another example, 4 feedback resources are available for selection in a TX sub-frame and each feedback resource can imply a pair of information bits: 0/0, 1/0, 0/1 and 1/1, respectively, such that two received sub-frames can be reported as implicit feedback information by feedback resource selection, and so forth.

The present invention can be used for enabling plural feedback reports in a single sub-frame transmitted from a data receiving party having received data in multiple sub-frames from a data sending party, without losing the single carrier properties. As explained above, it may be necessary to transmit plural feedback reports in a single sub-frame when using an asymmetric TDD transmission scheme and/or multiple streams/sessions in a single sub-frame.

The skilled person will understand that the following embodiments can also be applied in an FDD transmission scheme if the number of required feedback reports is greater than the number of bits in each available feedback resource. The data sending party may be a base station and the data receiving party may be a terminal, or vice versa.

Figure 1A:
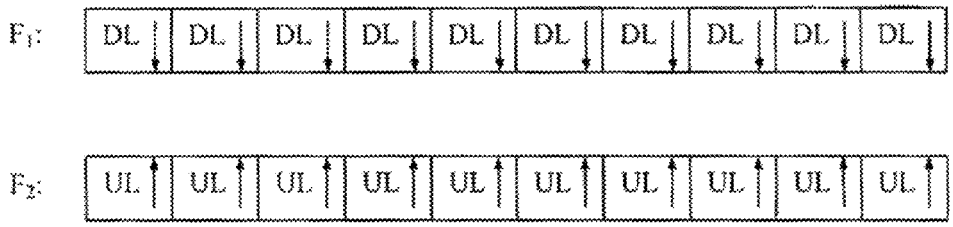
Fig. 1a (Prior Art)
FIG. 1a is a diagram illustrating a wireless FDD transmission scheme, according to the prior art.
Figure 1B:
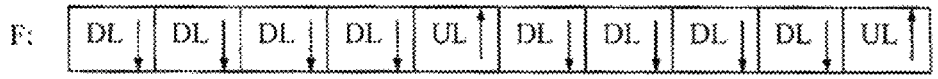
Fig. 1b (Prior Art)
FIG. 1b is a diagram illustrating a wireless TDD transmission scheme, according to the prior art.
Figure 2:
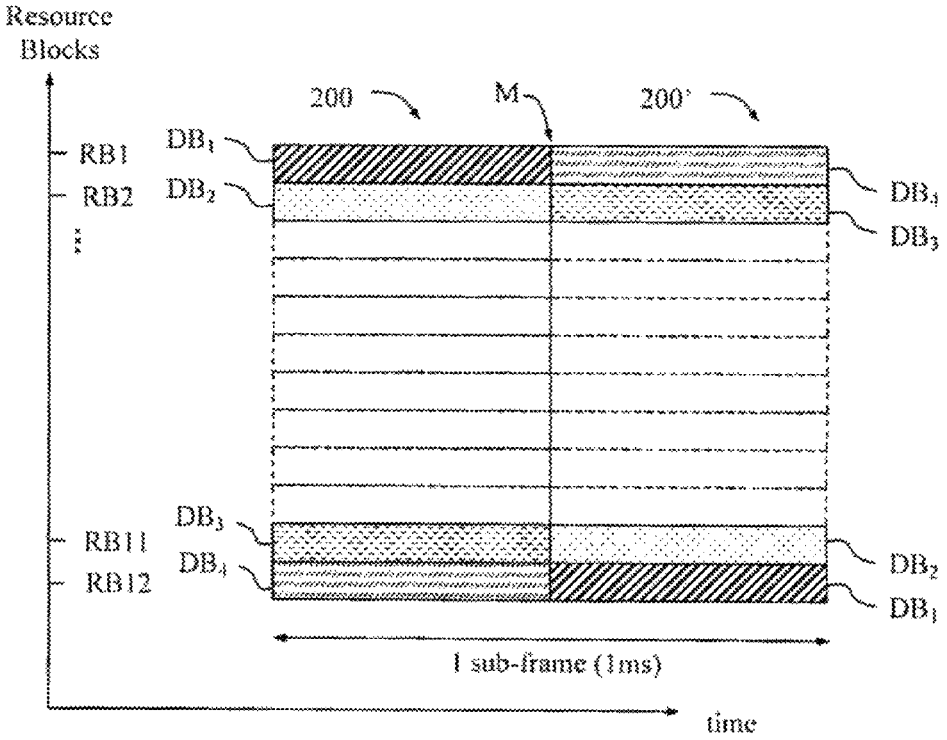
FIG. 2 is a diagram illustrating a package of resource blocks in multiple sub-carriers in a sub-frame, which can be used for the present invention.

The use of resource blocks as feedback resources will now be explained in more detail. A typical pattern of arranging resource blocks RBs in a sub-frame is illustrated in FIG. 2. In this example, a sub-frame of 1 ms comprises 12 resource block pairs. Information can thus generally be transmitted in the different resource blocks on the respective sub-carriers. In the middle M of the sub-frame, a data block DB in one resource block RBi can be mapped onto a different resource block RBj according to a frequency hopping scheme to obtain frequency diversity, thus forming a resource block pair Rbi/RBj. In other words, the transmission of the data block is moved to another resource block at another frequency within the total frequency carrier. In this example, the data block $DB_1$ in RB1 moves at M to RB12, the data block $DB_2$ in RB2 moves to RB11, and so forth.

In LTE, feedback reports, or ACK/NACKs, are typically transmitted from a terminal over the physical uplink control channel PUCCH which is allocated to one of the outmost resource blocks in the frequency carrier, unless user data is transmitted simultaneously, in which case they can be transmitted in other sub-carriers time-multiplexed with the user data. In FIG. 2, four resource blocks RB1, RB2, RB11 and RB12 have been allocated for feedback or ACK/NACK reports from different terminals. Within each resource block, each respective terminal can transmit a feedback report in a CDM fashion. Thereby, multiple orthogonal feedback reports can be transmitted by different terminals within each resource block. In other words, multiple resources are available for feedback reports within each sub-frame. In this description, each of these resources is called a feedback resource. Within each feedback resource, a terminal may transmit either a single information bit using BPSK modulation or two information bits using QPSK modulation.

A terminal receiving data packets in multiple downlink sub-frames may need to transmit multiple feedback reports in a single uplink sub-frame. However, since single carrier properties must be retained in uplink transmissions according to LTE, the terminal cannot transmit in, e.g., both resource blocks RB1 and RB3 and still transmit a single carrier signal, since these sub-carriers are not in contiguous spectrum, i.e. adjacent frequencies.

Further, due to the properties of the CDM component of the feedback report, it is not possible to transmit in resource blocks RB1 and RB2 either and still retain single carrier properties, as the information transmitted from the same terminal in RB1 and RB2 are uncorrelated, which implies that the single-carrier properties are lost also in this case. Instead, a terminal is able to convey additional implicit feedback information by transmitting on a selected feedback resource, when a plurality of feedback resources are available to the terminal.

Figure 3:
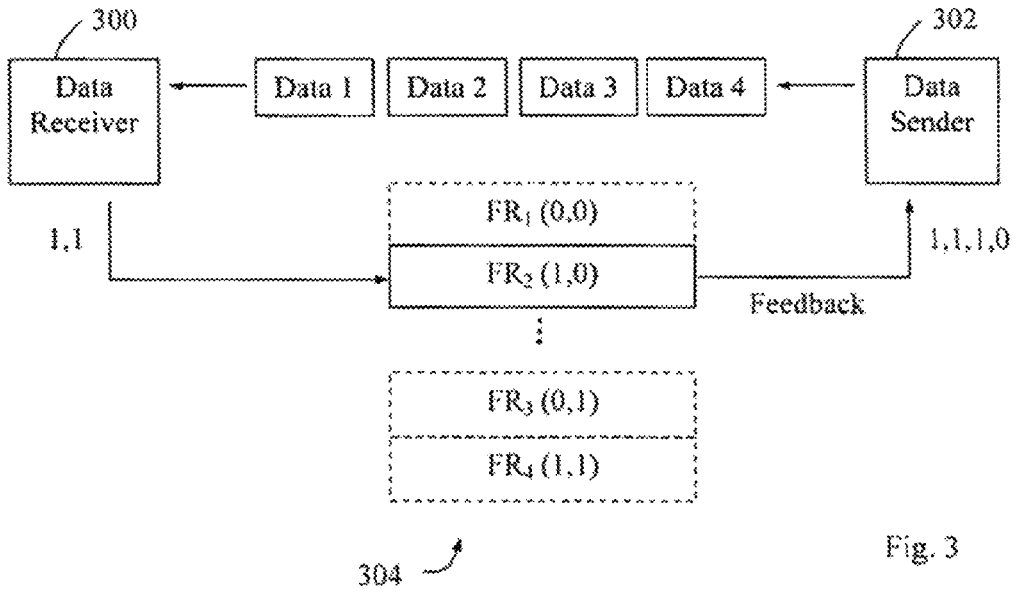
FIG. 3 is a block diagram illustrating how feedback reports for received data can be conveyed from a data receiving party to a data sending party, in accordance with one embodiment.

FIG. 3 illustrates schematically how feedback information can be conveyed from a data receiving party 300 to a data sending party 302 by means of feedback resource selection, according to an exemplary embodiment. The data sending party 302 sends four sets of data to the data receiving party 300, indicated as "Data 1", "Data 2", "Data 3" and "Data 4", each requiring an individual feedback report. The data sets 1-4 may be packets transmitted in sub-frames as described above, although the present invention is not specifically limited thereto. Throughout this description, the term "data set" is used to generally represent any chunk of data transmitted in a sub-frame or otherwise.

It is assumed that the data receiving party 300 has previously obtained information about which transmission resources are available in a particular TX sub-frame for feedback reporting, in this case four different feedback resources 304 denoted $FR_1$, $FR_2$, $FR_3$ and $FR_4$. This information is typically obtained in connection with cell selection or handover. The feedback resources 304 may be resource blocks in an allocated TX sub-frame in the manner described above, although the present invention is not limited to any particular type of feedback resources.

Each feedback resource 304 has been assigned to a specific feedback information code known by both parties, where each code contains two information bits. This code assignment may be communicated in an allocation message, or could be pre-configured in the equipment used. In this example, $FR_1$ is assigned to code (0,0), $FR_2$ is assigned to code (1,0), $FR_3$ is assigned to code (0,1), and $FR_4$ is assigned to code (1,1). These codes can be used for conveying implicit feedback information on received data in combination with explicit feedback information, i.e. as a combined codeword determined by the modulation symbol bits and the additional bits of resource selection.

It is further assumed in this example that the data receiving party 300 can send feedback information for the 4 received data sets in only one sub-frame using QPSK modulation, i.e. 2 information bits can be used for conveying explicit feedback information in that sub-frame. Hence, 2 bits are available for conveying explicit feedback information, but 4 feedback reports are required.

In the present solution, another two bits of implicit feedback information can be conveyed by transmitting the explicit feedback information on one of the 4 available feedback resources 304, such that the mere selection of feedback resource indicates two further feedback reports, i.e. the two bits in the respective feedback information code. The data receiving party 300 thus checks for errors in each received data set 1-4 and determines whether an ACK or NACK message is to be sent back to the data sending party for each data set 1-4. In the example shown in FIG. 3, data sets 1, 2 and 3 were received correctly but data set 4 was received incorrectly. The required feedback reports for data sets 1-4 can thus be encoded as a codeword "1,1,1,0", where 1=ACK and 0=NACK. Therefore, data receiving party 300 sends 2 explicit feedback reports "1,1" for data sets 1 and 2 over $FR_2$ which then represents implicit feedback reports "1,0" for data sets 3 and 4, hence "1,1,1,0".

Encoded feedback reports can be conveyed by different terminals in a sub-frame according to Table 1 below:

TABLE 1

| Feedback resource: | $FR_1$ | $FR_2$ | $FR_3$ | $FR_4$ | $FR_5$ | $FR_6$ | $FR_7$ | $FR_8$ |
|---|---|---|---|---|---|---|---|---|
| Terminal: | A | A | A | A | B | B | B | B |
| Associated code: | 0 | 1 | 2 | 3 | 0 | 1 | 2 | 3 |
| Selected resource: | | $FR_2$ | | | | | | $FR_8$ |
| Selected code: | | 1 | | | | | | 3 |

In Table 1, eight different feedback resources 1-8 in a given sub-frame are allocated to two terminals A and B, where resources 1-4 are allocated to terminal A and resources 5-8 are allocated to terminal B. Furthermore, feedback resources $FR_1$ and $FR_5$ are assigned to a feedback information code 0, $FR_2$ and $FR_6$ are assigned to a feedback information code 1, $FR_3$ and $FR_7$ are assigned to a feedback information code 2, and $FR_4$ and $FR_8$ are assigned to a feedback information code 3. It should be noted that the present invention generally allows for any number of feedback resources allocated for any number of terminals.

Thereby, terminals A,B can transmit explicit feedback information on one selected feedback resource to convey a feedback information code 0-3 as further implicit feedback information to the data sending party. If QPSK modulation is used, two bits of explicit feedback information $x_0$ and $x_1$ are sent on the selected feedback resource. The QPSK modulated symbol will then represent two feedback bits: bit 0 and bit 1, and the feedback resource selection will represent another two feedback bits: bit 2 and bit 3. Each of bits 0-3 can be either 0 or 1, as shown in Table 2 below:

TABLE 2

| | Bit 3 | Bit 2 | Bit 1 | Bit 0 |
|---|---|---|---|---|
| Feedback code 0: | 0 | 0 | $x_1$ | $x_0$ |
| Feedback code 1: | 0 | 1 | $x_1$ | $x_0$ |
| Feedback code 2: | 1 | 0 | $x_1$ | $x_0$ |
| Feedback code 3: | 1 | 1 | $x_1$ | $x_0$ |

Using Tables 1 and 2 for the example of FIG. 3, the data receiving party 300 transmits a QPSK modulated symbol with $x_0$=1 and $x_1$=1 as explicit feedback information to indicate successful reception of data sets 1 and 2, on selected feedback resource $FR_2$ representing feedback code 1 as implicit feedback information to indicate successful reception of data set 3 and unsuccessful reception of data set 4. Thereby, the 4 feedback reports "1,1,1,0", i.e. bits 0-3, are conveyed to the data sending party as a combined codeword.

The skilled person will readily understand that the embodiments above can be modified in various different ways, e.g. using different resource allocations, modulation methods and feedback encoding schemes, without limitation to the present invention. In the examples above, the number of feedback resources corresponds directly to the number of additional information bits for implicit feedback information. However, it should be noted that this idea can be generalized to using "M-ary" symbols for the case when the data receiving party, e.g. the terminal, can choose between M allocated feedback resources. For example, with 3 allocated feedback resources and transmitting a QPSK modulated symbol on the selected resource, the data receiving party can signal up to 3*4=12 different combined feedback codewords or bit patterns, shown in Table 3 below.

TABLE 3

| feedback codewords | Bit 3 | Bit 2 | Bit 1 | Bit 0 |
|---|---|---|---|---|
| 0 | 0 | 0 | 0 | 0 |
| 1 | 0 | 1 | 0 | 1 |
| 2 | 1 | 0 | 1 | 0 |
| 3 | 0 | 0 | 1 | 1 |
| 4 | 0 | 1 | 0 | 0 |
| 5 | 1 | 0 | 0 | 1 |
| 6 | 0 | 0 | 1 | 0 |
| 7 | 0 | 1 | 1 | 1 |
| 8 | 1 | 0 | 0 | 0 |
| 9 | 0 | 0 | 0 | 1 |
| 10 | 0 | 1 | 1 | 0 |
| 11 | 1 | 0 | 1 | 1 |

Using the present solution, the number of feedback resources that must be allocated to each terminal will increase exponentially with the number of feedback reports, i.e. bits, that is required. When many feedback reports are required, the feedback resource utilization will be correspondingly low. For example, if a combined codeword with 5 bits is required for feedback reporting and QPSK modulation is used, 3 additional bits must be conveyed by selecting a feedback resource. Hence, 8 feedback resources must then be allocated to the terminal to cover all combinations of 3 bits, resulting in a maximum resource utilization of ⅛ since only one of them can be used by the terminal to retain the single carrier properties.

On the network side, the base station to which the terminal is connected must be able to detect which feedback resource the terminal transmits feedback information on. For example, this could be done by using an energy detection criterion, i.e. detecting a received signal strength and determining if the received signal strength is strong enough to be distinguished from noise and/or interference. Alternatively or additionally, the used feedback resource can be detected by comparing the received signal strength on all allocated feedback resources and selecting the feedback resource having the highest signal strength and/or SINR (Signal-Noise Ratio). Both these approaches could also be combined to increase the probability of correct feedback resource detection.

Figure 4:
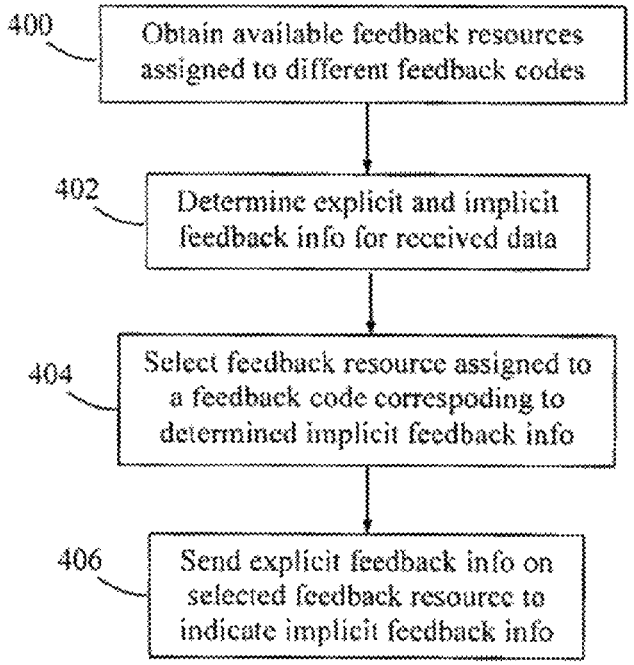
FIG. 4 is a flow chart illustrating a procedure in a data receiving party of sending feedback reports to a data sending party, in accordance with yet another embodiment.

FIG. 4 is a flow chart illustrating a procedure of conveying feedback reports for received data sets, from a data receiving party to a data sending party, as executed by the data receiving party. The data sending party may be a base station and the data receiving party may be a terminal, or vice versa. It is assumed that single carrier properties are required when transmitting feedback reports, and that the number of required feedback reports is greater than the number of bits available for feedback reporting by carrier modulation. This is often the case in the TDD mode of LTE when a terminal is required to send multiple feedback reports in a single sub-frame on the uplink for data received on the downlink In a first step 400, information is obtained on which feedback resources are allocated for transmitting feedback reports from the data receiving party, thereby enabling differentiated feedback reports by feedback resource selection. The obtained feedback resources are assigned to different feedback information codes which can be used as feedback reports, as explained above.

It is now assumed that the data receiving party receives plural data sets from the data sending party, requiring feedback reports. In a next step 402, explicit and implicit feedback information are determined for the data received from the data sending party. In this step, the received data is checked for errors and it is determined whether an ACK message or a NACK message is to be sent for each set of data. Depending on how many bits are available for explicit feedback reporting, i.e. by carrier modulation, one or more explicit feedback reports are determined to be sent by modulation. The remaining feedback reports are determined to be sent implicitly by feedback resource selection.

In a further step 404, a feedback resource is selected, out of the available feedback resources received in step 400, which is assigned to a feedback information code that corresponds to the determined implicit feedback information of step 402. Finally, the explicit feedback information is sent on the selected feedback resource to indicate the implicit feedback information, in a step 406. Thereby, both the explicit feedback information and the implicit feedback information is conveyed to the data sending party, without losing the single carrier properties.

Figure 5:
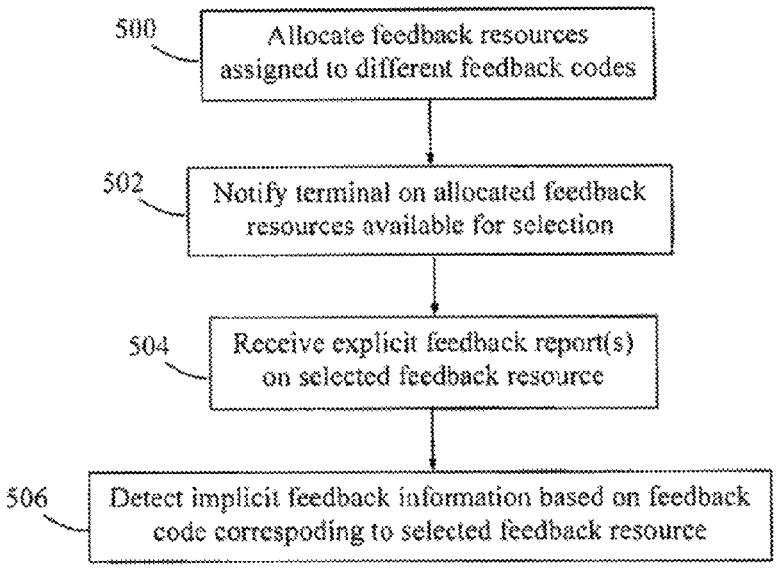
FIG. 5 is a flow chart illustrating a procedure in a network node, such as a base station, of receiving feedback reports from a data receiving party, in accordance with yet another embodiment.

FIG. 5 is a flow chart illustrating a procedure of receiving feedback reports from a terminal for transmitted data sets, as executed by a network node such as a base station transmitting the data sets. In this case, the network node is thus a data sending party and the terminal is a data receiving party. Again, is assumed that single carrier properties are required when the terminal transmits the feedback reports, and that the number of required feedback reports is greater than the number of bits available for feedback reporting by carrier modulation.

In a first step 500, a plurality of feedback resources are allocated to the terminal for selection when transmitting feedback reports to the network node, thereby enabling differentiated feedback reports by feedback resource selection. The received feedback resources are assigned to different feedback information codes which the terminal thus can use as feedback reports.

In a next step 502, the terminal is notified on which feedback resources are available for selection, which were allocated in the previous step 500. The available feedback resources can be communicated in a suitable control message, e.g. during a cell selection or handover procedure when the terminal locks on to the base station. This control message may be the generally known message "RCC CONNECTION SETUP" or a suitable broadcast message on the Broadcast Control Channel BCCH. Alternatively, the feedback resource allocation may be given by the downlink scheduling assignment for the terminal, or by which resources the data is transmitted on from the network node, e.g. base station, which will be described in more detail later below.

It is now assumed that the network node sends plural data sets to the terminal, which require feedback reports from the terminal. In a further step 504, one or more explicit feedback reports are received from the terminal on one of the feedback resources allocated in step 500, which has been selected by the terminal to convey further implicit feedback information.

Finally, the implicit feedback information is detected based on the feedback information code corresponding to the received feedback resource, in a step 506. Thereby, both the explicit feedback information and the implicit feedback information have been received from the terminal, without losing the single carrier properties when the feedback information is transmitted from the terminal.

Figure 6:
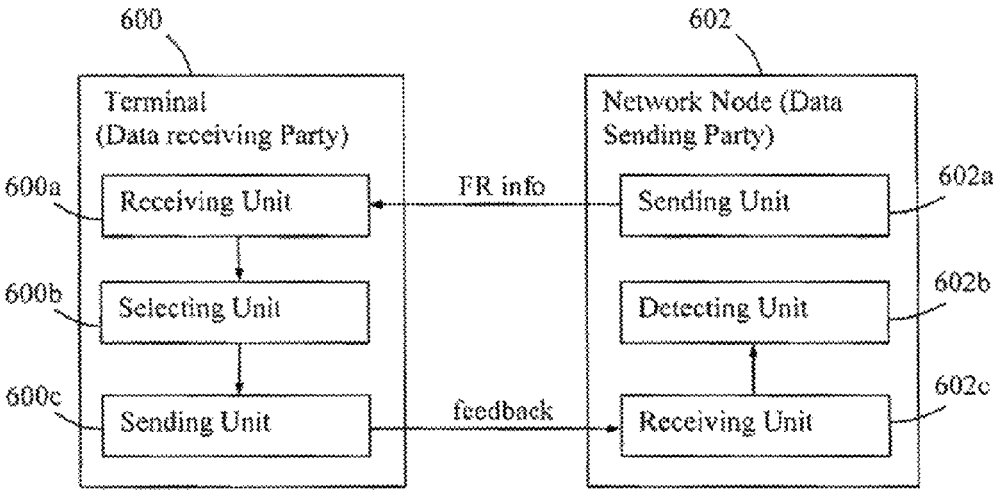
FIG. 6 is a block diagram illustrating a terminal acting as a data receiving party and a network node acting as a data sending party, in accordance with yet another embodiment.

FIG. 6 is a block diagram schematically illustrating a terminal 600 acting as a data receiving party and a network node 602 acting as a data sending party, e.g. a base station, when the terminal 600 sends feedback reports on the uplink for data received from the network node 602 on the downlink in a wireless connection. Again, is assumed that the terminal 600 is required to transmit the feedback reports with single carrier properties.

The terminal 600 comprises a receiving unit 600a (also referred to as a resource obtaining unit or circuit) adapted to receive allocation information "FR info" from the network node 602 about a plurality of feedback resources available for transmitting feedback reports. The feedback resources are associated with different feedback information codes which are known by the terminal. The terminal may have obtained such knowledge of which particular feedback information code each feedback resource is associated with in a suitable control message from the network node 602, e.g. during a cell selection or handover procedure, or it may have been pre-configured in the terminal.

The terminal 600 further comprises a selecting unit (or circuit) 600b adapted to select a feedback resource from the received feedback resources for transmission, to convey implicit feedback information depending on the outcome of the received data, i.e. to implicitly indicate correct or incorrect reception thereof. The selected feedback resource has thus been assigned to a feedback information code that corresponds to one or more feedback reports relevant for said received data. The terminal 600 also comprises a sending unit (or circuit) 600c adapted to send feedback information on the selected feedback resource to the data sending party, thereby implying the feedback information code assigned to the used feedback resource.

The receiving unit 600a, the selecting unit 600b and the sending unit 600c can be generally adapted to perform corresponding functions described in connection with FIGS. 3-5 above.

The network node 602 comprises a sending unit 602a (also referred to as a resource providing unit or circuit) adapted to send information "FR info" to the terminal 600 about a plurality of feedback resources allocated for transmitting feedback information, the feedback resources being assigned to and associated with different feedback information codes.

The network node 602 further comprises a receiving unit (or circuit) 602b adapted to receive feedback information on the transmitted data from the terminal on a feedback resource that has been selected by the terminal to convey implicit feedback information. The network node 602 also comprises a detecting unit (or circuit) 602c adapted to detect one or more feedback reports based on the feedback information code assigned to the selected feedback resource.

The sending unit 602a, the receiving unit 602b and the detecting unit 602c can be generally adapted to perform corresponding functions described in connection with FIGS. 3-5 above. It should be noted that FIG. 6 merely illustrates the various functional units 600a-c and 602a-c in a logical sense, while the skilled person is free to implement these functions in practice using any suitable software and hardware means.

It will now be described in more detail how feedback resources can be allocated for a terminal according to the above. When using the FDD mode in LTE, each downlink data packet directed to a specific terminal will identify which feedback resource on the uplink is available for a feedback report. In order to map a downlink data packet to a corresponding uplink feedback resource, three different methods can be used: 1) the feedback resource is given by which downlink scheduling assignment channel that contains control information related to the downlink data packet, 2) the uplink feedback resource is given by which resources the data packet itself, DL-SCH in LTE, is transmitted on, and 3) the uplink feedback resource is explicitly signaled by the base station.

These alternatives can also be applied when using the TDD mode. Each data packet sent on the downlink could be coupled to a specific given uplink feedback resource, regardless of which terminal the DL data packet is addressed to. This means that each terminal will receive one allocated feedback resource per received data packet. If only one data packet is received, one corresponding feedback resource will be allocated. If two data packets are received, two corresponding feedback resource will be allocated. If four DL data packets are received, four corresponding feedback resource will be allocated, and so forth.

In Table 4, an example of UL feedback resource allocation is given with two downlink sub-frames and up to four downlink scheduling assignment channels per downlink sub-frame.

TABLE 4

| | | | | | | | | |
|---|---|---|---|---|---|---|---|---|
| Terminal: | | | A | | A | | | |
| DL sub-frame: | | | 1 | | | 2 | | |
| DL scheduling channels: | 1 | 2 | 3 | 4 | 1 | 2 | 2 | 4 |
| UL feedback resource: | 1 | 2 | <u>3</u> | 4 | <u>5</u> | 6 | 7 | 8 |

In this example, terminal A is scheduled to receive data in both downlink sub-frames 1 and 2, and therefore UL feedback resources 3 and 5, underlined, are allocated to terminal A. That terminal's feedback report will then include selection of either one of the feedback resources 3 and 5, depending on what feedback status it needs to report.

Using this approach, both the base station and the terminal will be aware of which feedback resources have been allocated to the terminal for selection. The base station naturally knows what scheduling decisions it has made for the terminal, whereas the terminal knows which downlink resources it has received.

Although the description above is generally concerned with the case when a single bit of feedback reporting is required for each received downlink data packet, and multiple received data packets are reported in a single uplink sub-frame, the present invention can be generally applied to any case when more than two bits of feedback information are needed. For example, this solution could also be used for reporting the quality of received so-called "soft bits", which redundancy version that should be re-transmitted, or if it is mainly some specific part of the data packet that was received erroneously. The term "feedback information" is used in this description to generally represent any type of information relating to errors or quality of the received data and/or relating to the needed retransmission.

Although the description above is focused on the TDD mode of LTE, it should also be noted that it could also be used for half-duplex FDD mode, i.e., when the terminal cannot transmit and receive at the same time.

An advantage of this invention is that feedback reports, such as ACK/NACK, for multiple received data packets can be conveyed in a single sub-frame, still retaining the required single carrier properties of the transmitted signals. This will also allow for increased peak rate in downlink transmissions. If a feedback report for basically only one received data packet can be transmitted per available uplink sub-frame as in the previously known solutions, it is not possible to schedule a single terminal in all downlink sub-frames for greatly asymmetric connections, e.g. 4 DL:1 UL, consequently limiting the peak rate for downlink data. Using the present invention, it is possible to schedule a single terminal in all downlink sub-frames of a radio frame, thereby achieving a greater downlink peak rate.

Furthermore, any unnecessary re-transmissions of correctly received data packets can be avoided since each received data packet is reported individually, which will further increase the downlink peak rate and capacity.

The present solution could also be defined as a method in a User Equipment (UE) operating in a communication system employing a protocol for correcting block errors that occurs over the air interface, said protocol involves transmission of uplink feedback reports from the UE that receives data to the transmitter of said data, comprising the steps of receiving from the system more than one resource on which the feedback reports can be transmitted, whereby each resource is assigned a binary code; and choosing from the received resources one resource to transmit on, whereby the specific binary code that is assigned to the selected resource is utilized as feedback information.

The present solution could also be defined as a User Equipment capable of operating in a communication system employing a protocol for correcting block errors that occurs over the air interface, said protocol involves transmission of uplink feedback reports, comprising means for performing the method above.

The present solution could also be defined as a method in a network node operating in a communication system employing a protocol for correcting block errors that occurs over the air interface, said protocol involves transmission of uplink feedback reports from the UE that receives data to the transmitter of said data, comprising the steps of providing each UE with more than one resource on which the feedback reports can be transmitted, whereby each resource is assigned a binary code;

allowing the UE to choose from the received resources one resource to transmit on, whereby the specific binary code that is assigned to the selected resource is utilized as feedback information, and detecting the feedback information based on detection of the received resource blocks that the UE transmits on.

The present solution could also be defined as a network node capable of operating in a communication system employing a protocol for correcting block errors that occurs over the air interface, said protocol involves transmission of uplink feedback reports, comprising means for performing the method above.

While the invention has been described with reference to specific exemplary embodiments, the description is in general only intended to illustrate the inventive concept and should not be taken as limiting the scope of the invention. Although the concepts of 3GPP, LTE, HSPA, MAC, radio frames, sub-frames, HARQ soft combining and ACK/NACK messages have been used when describing the above embodiments, any other similar suitable standards, protocols and mechanisms may basically be used to accomplish the functions described herein. In particular, the above-described embodiments could be applied in TDD as well as half duplex FDD transmission schemes. The present invention is generally defined by the following independent claims.

The invention claimed is:

1. A method implemented by a data receiving party for conveying feedback reports from the data receiving party for data received from a data sending party in a wireless connection, the method comprising:

obtaining allocation information about a plurality of feedback resources available for transmitting feedback reports, wherein said feedback resources [are associated with different feedback information codes that the data receiving party] can [use] *be used* to convey implicit feedback information on received data;

selecting a feedback resource from the plurality of feedback resources available, the selected feedback resource [assigned to a feedback information code that] corresponds to one or more feedback reports on said received data; and sending explicit feedback information on the selected feedback resource to the data sending party to indicate implicit feedback information different from the explicit feedback information.

2. The method of claim 1, wherein sending feedback information on the selected feedback resource comprises sending explicit feedback information on the selected feedback resource, and wherein the selected feedback resource further indicates implicit feedback information.

3. The method of claim 1, wherein sending feedback information on the selected feedback resource comprises conveying two bits of explicit feedback information using Quadrature Phase-Shift Keying, QPSK, modulation and conveying at least one further bit of implicit feedback information using the feedback resource selection, thereby forming a combined codeword with said two bits of explicit feedback information and at least one further bit of implicit feedback information.

4. The method of claim 3, wherein each bit in the combined codeword formed relates to a specific sub-frame of said received data.

5. The method of claim 1, wherein the data receiving party comprises a terminal and the data sending party comprises a network node.

6. The method of claim 5, wherein obtaining allocation information about a plurality of feedback resources available comprises receiving said allocation information in a control message during a cell selection or handover procedure.

7. The method of claim 5, wherein obtaining allocation information about a plurality of feedback resources available comprises receiving said allocation information based on a downlink scheduling assignment for the terminal or based on which resources said received data is transmitted on from the network node.

8. The method of claim 1, wherein a Time Division Duplex, TDD, or half duplex Frequency Division Duplex, FDD, transmission scheme is employed in a connection between said data sending and receiving parties.

9. The method of claim 1, wherein a Hybrid ARQ protocol is used whereby each feedback report includes an ACK message or a NACK message relating to data in a received sub-frame.

10. An apparatus in a data receiving party for conveying feedback reports for data received from a data sending party in a wireless connection, comprising:

a resource obtaining circuit configured to obtain allocation information about a plurality of feedback resources available for transmitting feedback reports, wherein said feedback resources [are associated with different feedback information codes that the data receiving party] can [use] *be used* to convey implicit feedback information on received data;

a selecting circuit configured to select a feedback resource from the plurality of feedback resources available, the selected feedback resource [assigned to a feedback information code that] corresponds to one or more feedback reports on said received data; and a sending circuit configured to send explicit feedback information on the selected feedback resource to the data sending party to indicate implicit feedback information different from the explicit feedback information.

11. The apparatus of claim 10, wherein the sending circuit is configured to send feedback information on the selected feedback resource by sending explicit feedback information on the selected feedback resource, and wherein the selected feedback resource further indicates implicit feedback information.

12. The apparatus of claim 10, wherein the sending circuit is configured to send feedback information on the selected feedback resource by conveying two bits of explicit feedback information using Quadrature Phase-Shift Keying, QPSK, modulation and conveying at least one further bit of implicit feedback information using the feedback resource selection, thereby forming a combined codeword with said two bits of explicit feedback information and at least one further bit of implicit feedback information.

13. The apparatus of claim 12, wherein each bit in the combined codeword formed relates to a specific sub-frame of said received data.

14. The apparatus of claim 10, wherein the data receiving party comprises a terminal and the data sending party comprises a network node.

15. The apparatus of claim 14, wherein the resource obtaining circuit is configured to obtain said allocation information by receiving said allocation information in a control message during a cell selection or handover procedure.

16. The apparatus of claim 14, wherein the resource obtaining circuit is configured to obtain said allocation information by receiving said allocation information based on a downlink scheduling assignment for the terminal or based on which resources the data is transmitted on from the network node.

17. The apparatus of claim 10, wherein a Time Division Duplex, TDD, or half duplex Frequency Division Duplex, FDD, transmission scheme is employed in the connection between said data sending and receiving parties.

18. The apparatus of claim 10, wherein the data receiving party is configured to use a Hybrid ARQ protocol whereby each feedback report includes an ACK message or a NACK message relating to data in a received sub-frame.

19. A method implemented by a network node for obtaining feedback reports from a terminal for data transmitted to the terminal from the network node in a wireless connection, the method comprising:

providing allocation information to the terminal about a plurality of feedback resources available for transmitting explicit feedback information, wherein said feedback resources [are associated with different feedback information codes that the terminal] can [use] *be used* to convey implicit feedback information on received data that is different than the explicit feedback information;

receiving feedback information for said transmitted data from the terminal on a feedback resource selected by the terminal; and detecting one or more feedback reports based on the *received* feedback information [code assigned to] *and* the selected feedback resource.

20. The method of claim 19, wherein receiving feedback information on a feedback resource selected by the terminal comprises receiving explicit feedback information on the selected feedback resource, and wherein the selected feedback resource further indicates implicit feedback information.

21. The method of claim 19, wherein receiving feedback information on a feedback resource selected by the terminal comprises detecting which feedback resource the terminal transmits the feedback information on, by detecting a received signal strength and determining if the received signal strength is strong enough to be distinguished from noise and/or interference.

22. The method of claim 19, wherein receiving feedback information on a feedback resource selected by the terminal comprises detecting which feedback resource the terminal transmits the feedback information on, by comparing the received signal strength on all allocated feedback resources and selecting the feedback resource with the highest received signal strength and/or Signal-to-Interference-plus-Noise Ratio, SINR.

23. The method of claim 19, wherein providing allocation information to the terminal comprises sending said allocation information in a control message during a cell selection or handover procedure.

24. The method of claim 19, wherein providing allocation information to the terminal comprises providing said resource allocation information based on a downlink scheduling assignment for the terminal or based on which resources the data is transmitted on from the network node.

25. An apparatus in a network node for obtaining feedback reports from a terminal for data transmitted to the terminal from the network node in a wireless connection, comprising:

a resource providing circuit configured to provide allocation information to the terminal about a plurality of feedback resources available for transmitting explicit feedback information, wherein said feedback resources [are associated with different feedback information codes that the terminal] can [use] *be used* to convey implicit feedback information on received data that is different than the explicit feedback information;

a receiving circuit configured to receive feedback information for said transmitted data from the terminal on a feedback resource selected by the terminal; and a detecting circuit configured to detect one or more feedback reports based on the *received* feedback information [code assigned to] *and* the selected feedback resource.

26. The apparatus of claim 25, wherein the receiving circuit is configured to receive explicit feedback information on the selected feedback resource and implicit feedback information as indicated by the selected feedback resource.

27. The apparatus of claim 25, wherein the receiving circuit is configured to detect which feedback resource the terminal transmits the feedback information on, by detecting a received signal strength and determining if the received signal strength is strong enough to be distinguished from noise and/or interference.

28. The apparatus of claim 25, wherein the receiving circuit is configured to detect which feedback resource the terminal transmits the feedback information on, by comparing the received signal strength on all allocated feedback resources and selecting the feedback resource with the highest received signal strength and/or Signal-to-Interference-plus-Noise Ratio, SINR.

29. The apparatus of claim 25, wherein the resource providing circuit is configured to send said allocation information in a control message during a cell selection or handover procedure.

30. The apparatus of claim 25, wherein the resource providing circuit is configured to provide said allocation information based on a downlink scheduling assignment for the terminal or based on which resources the data is transmitted on from the network node.

* * * * *